United States Patent Office 2,755,224
Patented July 17, 1956

2,755,224

PROCESS FOR IMPROVING LUBRICATING OILS

David W. Young and Byron M. Vanderbilt, Westfield, Delmer L. Cottle, Highland Park, and Arnold J. Morway, Rahway, N. J., assignors to Esso Research and Engineering Company, a corporation of Delaware No Drawing. Application December 18, 1952,
Serial No. 326,767

7 Claims. (Cl. 196—23)

The present invention relates to a process for improving the viscosity and viscosity index of lubricating oils. The invention is applicable not only to mineral base lubricating oils but also to certain synthetic oils which have the property of condensing to form larger molecules when treated according to the invention. Thus, it is applicable to polyglycol or glycol ether types of synthetic oils, ester type oils, formals, polyolefins, and the like.

Fundamentally the invention is based on the discovery that the viscosity of a lubricating oil may be increased measurably and the viscosity index of such oil may be considerably improved by treating the oil at an elevated temperature with a small amount of a highly halogenated lower hydrocarbon. In particular, an oil may be improved by treating it with 0.1 to 5% by weight, based on the oil, of highly halogenated $C_1$ to $C_2$ hydrocarbons. Carbon tetrachloride is the preferred treating agent because it is economical and highly reactive, but chlorinated ethanes such as ethylene dichloride and other halogenated methanes and ethanes such as chloroform, for example, may also be used in the same manner. Other halides of methane and/or ethane may be used, such as the chloride-bromides, bromides, iodides, chloride-fluoride compounds, and mixtures thereof.

According to the invention the halogenated hydrocarbon, typified by carbon tetrachloride or chloroform, is mixed with the oil and the mixture is heated to a fairly high temperature for an extended period of time. The temperature may range from 175 to 400° C. and the time of heating may be as little as a few minutes, e. g. 10 minutes or less to as much as 10 hours or more. The preferred treatment involves heating with 1 to 3% by weight of carbon tetrachloride at a temperature ranging between 200 and 250° C. for a period of ½ to 10 hours. Treatment with 3% of carbon tetrachloride for a period of 4 hours at a temperature between 200 and 250° C. e. g. by bubbling vaporized $CCl_4$ through the heated oil, has been found in experiments to be highly effective to improve the viscosity and viscosity index both of mineral base lubricating oils and glycol ether types of synthetic oil.

The invention will be more particularly explained in connection with the following specific examples.

Three different types of mineral lubricating oils were treated with 3% of carbon tetrachloride, based on the weight of the oil. In each case the time of treatment was four hours and the temperature of the reaction was between 240 and 250° C. The $CCl_4$, which vaporized, was passed through the oil continuously at about atmospheric pressure. Oil A was a conventionally refined Mid-Continent oil of about 55 S. S. U. viscosity at 210° F. Oil B was a Coastal stock of slightly higher viscosity about 58 S. S. U. at 210° F. and oil C was a lighter Coastal stock of about 35 S. S. U. viscosity at 210° F. These oils were placed in a bomb after being heated with $CCl_4$ for the period indicated above. No catalyst was used, the reaction taking place simply by heat. In each case the viscosity of the oil increased moderately and the viscosity index was improved measurably. The data are tabulated in Table I below.

Table I

PHYSICAL PROPERTIES OF OILS

| Name of Oil | Oil A | Oil A | Oil B | Oil B | Oil C | Oil C |
|---|---|---|---|---|---|---|
| Percent $CCl_4$ Used | None | 3.00 | None | 3.00 | None | 3.00 |
| Time of reaction, hours | None | 4 | None | 4 | None | 4 |
| Temp. of reaction, °C | None | 240–250 | None | 240–250 | None | 240–250 |
| S. S. U. Vis. at 100° F | 482.8 | 531.8 | | | 72.3 | 109 |
| S. S. U. Vis. at 210° F | 55.3 | 57.3 | 58.4 | 61.8 | 36.4 | 39.8 |
| V. I. | 44 | 46.0 | | | 82 | 84 |
| Pour Point, °F | −20 | −20 | | | +30 | +30 |
| Neut. No. | | 0.29 | | 0.13 | | 0.17 |

When the oils were heated in the same bomb without carbon tetrachloride for the same period and at the same temperatures no change in physical properties could be detected.

The products of oil A and oil C, after treatment with $CCl_4$, were also evaluated as plasticizers in GR-S (butadiene-styrene) synthetic rubber. It was observed that the treated oils were better plasticizers than the original untreated oils. The same results were observed when the treated oils were used as plasticizers in commercial synthetic rubber A obtained by polymerizing butadiene and acrylonitrile. These data are summarized in Table II. A better plasticizer is one that has the ability to reduce the viscosity as measured by the Mooney Viscosity Tester, to a great extent. When an effective plasticizer of low cost is found a higher molecular weight polymer may be formulated in a plant and the plasticizer allows it to be processed and worked in a rubber mill. The higher the Mooney viscosity the larger the quantity of oil type plasticizer that can be added to rubber. The overall cost of the stock is reduced without loss in other good properties.

Table II

PLASTICIZERS IN GR-S

| | Oil A | $CCl_4$ Treated Oil A | 2′ Mooney Viscosity |
|---|---|---|---|
| GR-S | 10 | None | 92 |
| GR-S | None | 10% | 86 |
| GR-S | None | None | 112 |

PLASTICIZERS IN PARACRIL

| | Oil A | $CCl_4$ Treated Oil A | 2′ Mooney Viscosity |
|---|---|---|---|
| Synthetic Rubber A | 13 | None | 35 |
| Synthetic Rubber A | None | 13 | 32 |

| | Oil C | $CCl_4$ Treated Oil C | 2′ Mooney Viscosity |
|---|---|---|---|
| Synthetic Rubber A | 10 | | 42 |
| Synthetic Rubber A | | 10 | 33 |

The lubricating properties of these CCl₄ treated mineral oils were also evaluated. The products were tested for load bearing properties on the Almen extreme pressure testing machine and the tests showed that the treated oils would invariably carry more weights than the original untreated starting oil.

The invention is applicable also to lubricating oils which are to be modified by conventional additives such as detergents, polysilicone defoamers and the like. It can be applied to lubricating greases based on such oils. For example, a mineral base lubricating oil was treated with 3% of CCl₄ in a steel bomb at 250° C. for one hour. The oil increased in viscosity by 8% and improved in viscosity index by 12%. To this oil there was added 5% by weight of an alkyl phenol sulfide salt type detergent. It was found desirable to add a small amount, 0.005% by weight, of a polysilicone oil to reduce the foaming tendency of this oil. When so treated the oil was a satisfactory lubricant.

A commercial synthetic lubricating oil was treated with carbon tetrachloride in substantially the same manner as the mineral oils described above. This particular oil is understood to be derived from propylene oxide or mixtures of propylene and ethylene oxides and n-butyl alcohol. It appears to be a n-butyl ether of polypropylene glycol. In this case it was treated with 3% by weight, based on the oil, of carbon tetrachloride for 30 minutes at 200° C. in a steel bomb. The product thereafter was diluted with ether, washed, dried and stripped and the properties of the treated oil were compared with those of the original. Both the viscosity and the viscosity index of the treated oil were much improved and it had superior extreme pressure properties. Some viscosity results are shown in Table III.

Table III

| Oil | Vis. at 210° F., cs. | V. I. |
|---|---|---|
| Original Oil | 5.89 | 128 |
| Treated Oil | 6.73 | 139 |

While the exact mechanism is not clearly understood, it appears that the treatment with carbon tetrachloride or other polyhalides of methane or ethane results in the condensation of two or more molecules of the oil with the elimination of hydrogen halide. The latter, when volatile, is readily removed from the oil and takes most of the halogen out of the mixture. It appears, however, that a small amount of the halogen remains. This apparently accounts for the increase in load bearing properties of the oil since the halogens, particularly chlorine, are known to be potent extreme pressure additives. In any event, the oil is substantially improved in several respects at very little expense and to an unexpected degree in view of the simplicity of the treatment. Treating times may be as short as 10 minutes under some conditions and with some types of lubricants but in any case the temperature and the treating time should be adjusted so as to obtain the desired results. These results, in general, can be measured roughly by the increase in viscosity, which apparently results from increasing molecular weight, along with improvement in viscosity index.

An ester was formed by reacting 90 g. butanediol 1–3, 288 g. C₈ Oxo acid, using 100 g. xylene as entrainer and in the presence of 3.62 g. NaHSO₄ and 3.62 g. phenothiazine. The above mixture was heated under reflux with a side take off arm to remove H₂O. The temperature was held from 105° C. to 130° C. for 10 hours. Under these conditions a total of 34 cc. of water was removed as a by-product. This ester was then placed in a vacuum still and stripped to 200° C. pot temperature and 2 mm. mercury pressure. A final lubricating composition was made with the following inspections:

S. S. U. at 100° F. _____ 140.9
S. S. U. at 210° F. _____ 46.0
Flash, °F. _____ 420
Pour point, °F. _____ −5

This ester was then treated with 5% CCl₄ at 250° C. for 4 hours in a stainless steel bomb. After this the product was placed in a large evaporating dish on a steam plate for 6 hours to remove any unreacted CCl₄. Inspections on the CCl₄ treated ester are recorded:

S. S. U. at 100° F. _____ 143.7
S. S. U. at 210° F. _____ 47.9
Flash, °F _____ 435
Pour point, °F. _____ −20

Specific examples of some synthetic oils have been given above, and it is evident that the process of this invention is applicable to other types of synthetic oils especially the di-esters such as di-2-ethylhexyl sebacate, the corresponding adipates, and the complex esters resulting from combinations of dihydric alcohols, dibasic acids, and monofunctional acids and/or alcohols. The latter types of synthetic oils are now well known in the art and the application of this invention to them will be obvious. Polyolefin type synthetic oils may be treated likewise.

The invention is applicable also to lubricants having an acetal structure and in fact is applicable to any organic product having terminal groups which can react with the halogenated hydrocarbon to eliminate a hydrohalide molecule and combine two molecules of the organic material into one. This is an advantageous and inexpensive method for improving the properties of oils and is applicable to a wide variety of products.

The products treated obviously may be modified with conventional additives such as anti-oxidants, metal deactivators, corrosion inhibitors, rust inhibitors, load carrying agents, thickeners, tackiness agents and other modifiers in conventional proportions as is well understood in the art.

What is claimed is:

1. The process of increasing viscosity and improving the viscosity index of a lubricating oil which consists essentially in mixing 0.1 to 5% by weight of a polyhalogenated C₁–C₂ hydrocarbon into said oil and heating the mixture at a temperature of 175° to 400° C. for 10 minutes to 10 hours.

2. Process according to claim 1 wherein the oil is a mineral base lubricating oil.

3. Process according to claim 1 wherein the oil is a synthetic polyglycol oil.

4. Process according to claim 1 wherein the oil is a synthetic diester.

5. Process according to claim 1 where 1 to 3% of the polyhalogenated hydrocarbon is used and the temperature range is 200° to 250° C.

6. Process according to claim 1 wherein the polyhalogenated hydrocarbon is carbon tetrachloride.

7. Process according to claim 1 wherein the polyhalogenated hydrocarbon is vaporized and passed through said oil while the oil is kept heated to 200° to 250° C.

References Cited in the file of this patent

UNITED STATES PATENTS

| | | |
|---|---|---|
| 1,788,204 | Posth | Jan. 6, 1931 |
| 1,796,857 | Barnard | Mar. 17, 1931 |
| 1,878,262 | Chappell | Sept. 20, 1932 |
| 2,585,820 | Le Grand Morell | Feb. 20, 1952 |